United States Patent [19]
Giles et al.

[11] Patent Number: 5,207,037
[45] Date of Patent: May 4, 1993

[54] WALL PARTITION UNITS

[75] Inventors: Christopher D. Giles; Steven E. McNeal, both of Grand Rapids, Mich.

[73] Assignee: Lippert Holding Company, Zeeland, Mich.

[21] Appl. No.: 845,715

[22] Filed: Mar. 4, 1992

Related U.S. Application Data

[63] Continuation of Ser. No. 539,337, Jun. 18, 1990, Pat. No. 5,138,814.

[51] Int. Cl.⁵ .................... E04B 2/82; E04F 17/08
[52] U.S. Cl. .................... 52/126.6; 52/126.4; 52/239; 52/220.7
[58] Field of Search ............ 52/220, 221, 239, 241, 52/242, 126.3, 126.4, 288, 126.6

[56] References Cited

U.S. PATENT DOCUMENTS

| | | | |
|---|---|---|---|
| 2,766,855 | 10/1956 | Johnson et al. | 52/126.3 |
| 3,066,770 | 12/1962 | Millard et al. | 52/220 |
| 3,217,452 | 11/1965 | Steel | 52/241 |
| 3,551,584 | 12/1970 | Rose | 52/221 X |
| 3,593,468 | 7/1971 | Bustin | 52/221 X |
| 3,708,607 | 1/1973 | Brode et al. | 52/221 X |
| 3,844,079 | 10/1974 | Karrip | 52/221 |
| 3,990,204 | 11/1976 | Haworth et al. | 52/242 X |
| 4,060,294 | 11/1977 | Haworth et al. | 52/221 X |
| 4,133,153 | 1/1979 | Hage | 52/242 X |
| 4,224,769 | 9/1980 | Ball et al. | 52/221 |
| 4,449,337 | 5/1984 | Gzym et al. | 52/242 X |
| 4,470,232 | 9/1984 | Condevaux et al. | 52/242 X |
| 4,593,505 | 6/1986 | Russell | 52/242 X |
| 4,683,695 | 8/1987 | Galli | 52/242 X |
| 4,713,918 | 12/1987 | Cioffi | 52/242 X |
| 4,967,531 | 11/1990 | Giles | 52/584 |
| 5,004,371 | 4/1991 | Sorensen | 52/239 X |
| 5,062,246 | 11/1991 | Sykes | 52/242 X |

Primary Examiner—David A. Scherbel
Assistant Examiner—Robert Carfield
Attorney, Agent, or Firm—Hugh Adam Kirk

[57] ABSTRACT

The partition wall units include panels with mitered tubular frame strips, posts, raceways which also can be adapted for baseboards, and covering edge strips. Most of these units include a groove along an outer edge into which are removably mounted interlocking or interhooking key members having uniform C-shaped cross-sections. These C-shaped cross-section key members on adjacent edges slideably engage each other to form cylindrical apertures between the two interhooked C's. Self-tapping screws are then screwed into these cylindrical apertures near the ends of the adjacent strip for locking the two units together. The substantially rectangular tubular frame strips around the panels have mitered joints which are connected by a pair of longitudinally complementary angle blocks with complementary grooves along their legs between their abutting surfaces. Self-tapping screws are screwed into these leg grooves to wedge the blocks apart to frictionally engage the inner surfaces of the tubular frame strips at their mitered corners to hold the joints together. The raceway units have a uniform I-shaped cross-section in which at least one end of the "I" is provided with a C-shaped key member, and the outer edges of the "I" are provided with grooves for hinging and snapping longitudinal cover strips which form channels into which conduits may be placed. Also, the webs of the "I" may be provided with apertures for electrical outlets and for mounting flanged sleeves for supporting levelling bolts or legs when the raceway channels are used as baseboards.

5 Claims, 6 Drawing Sheets

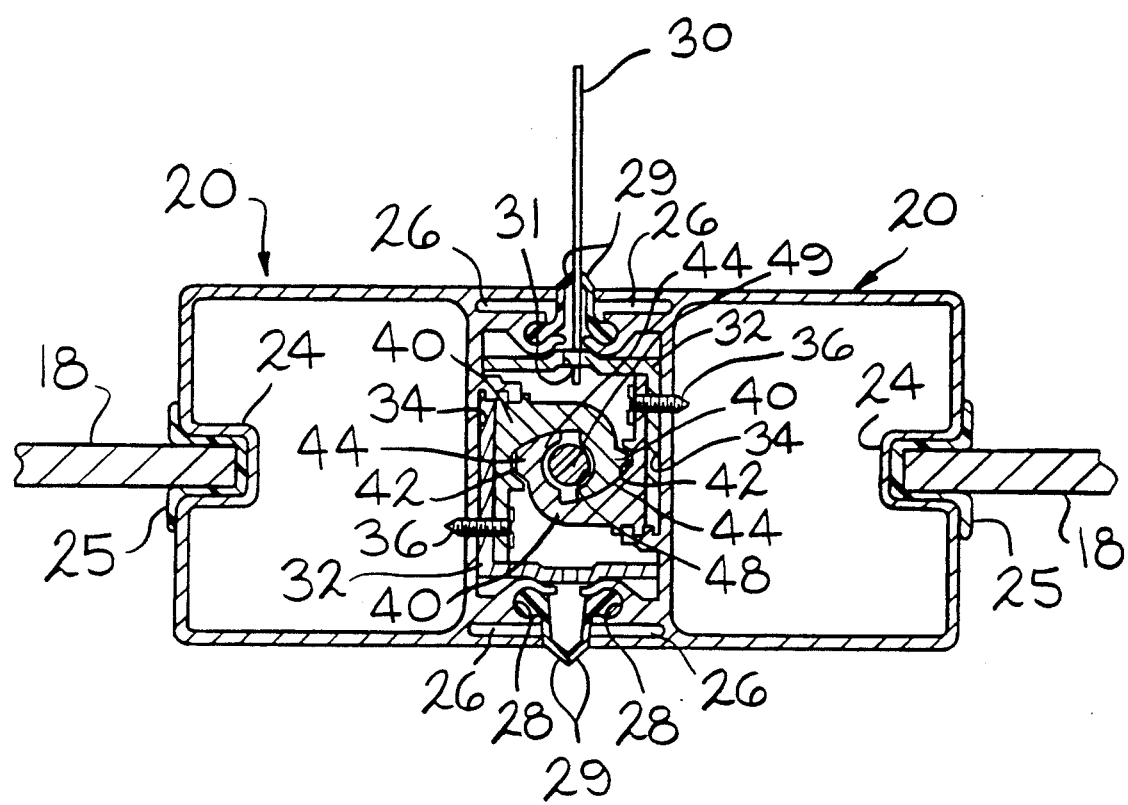
FIG. II

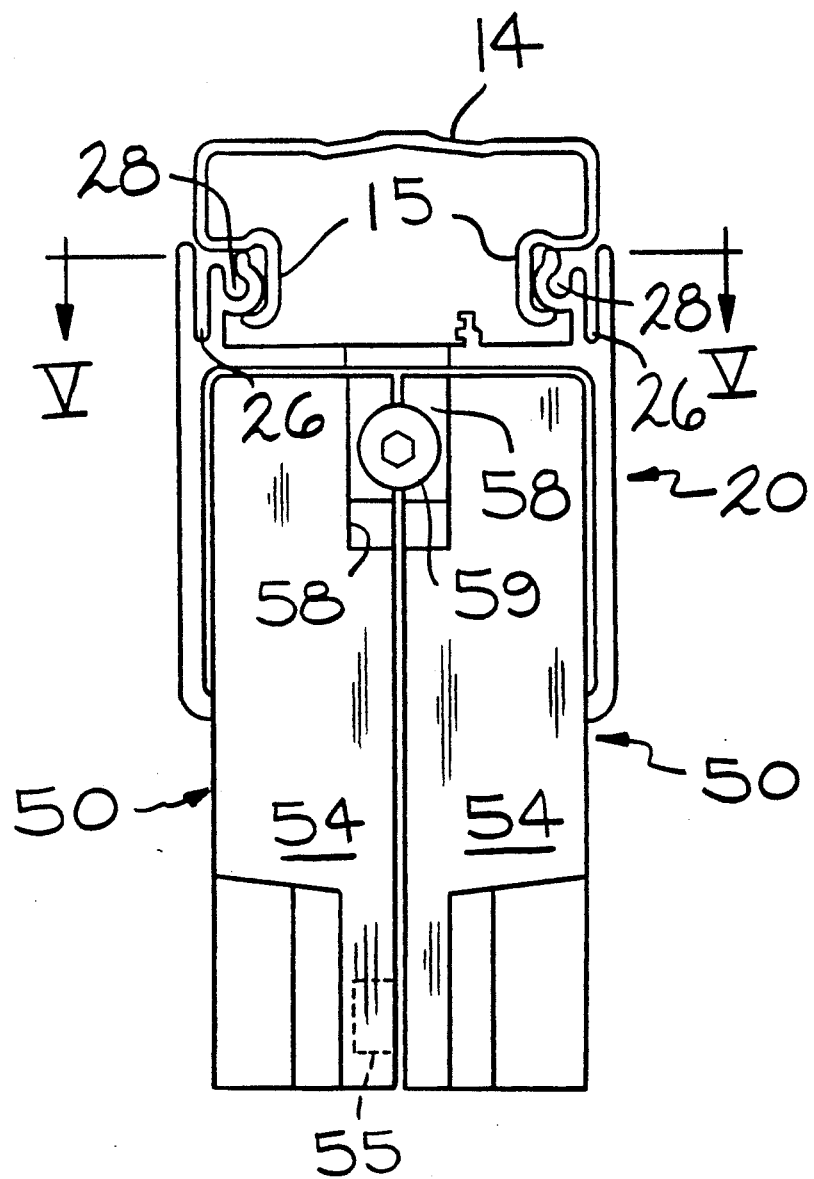
FIG. III

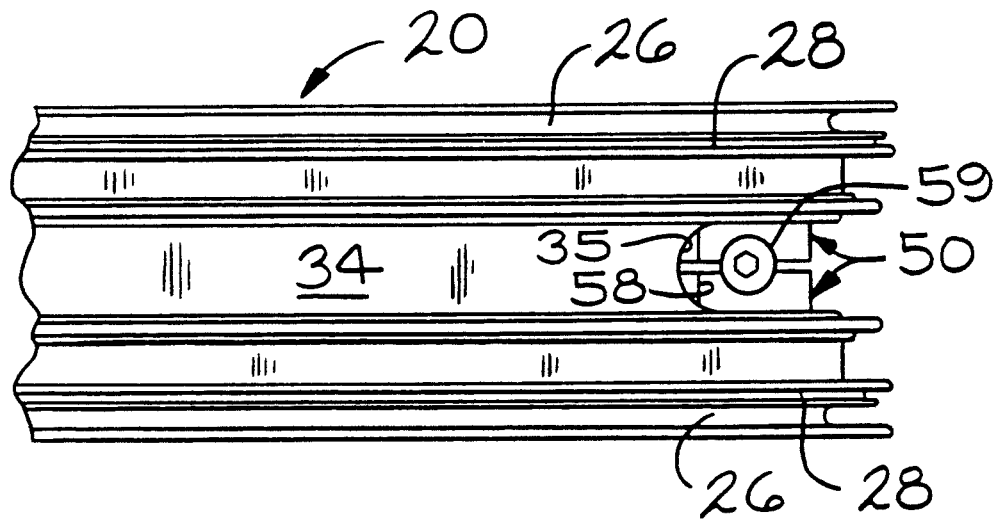
FIG. V
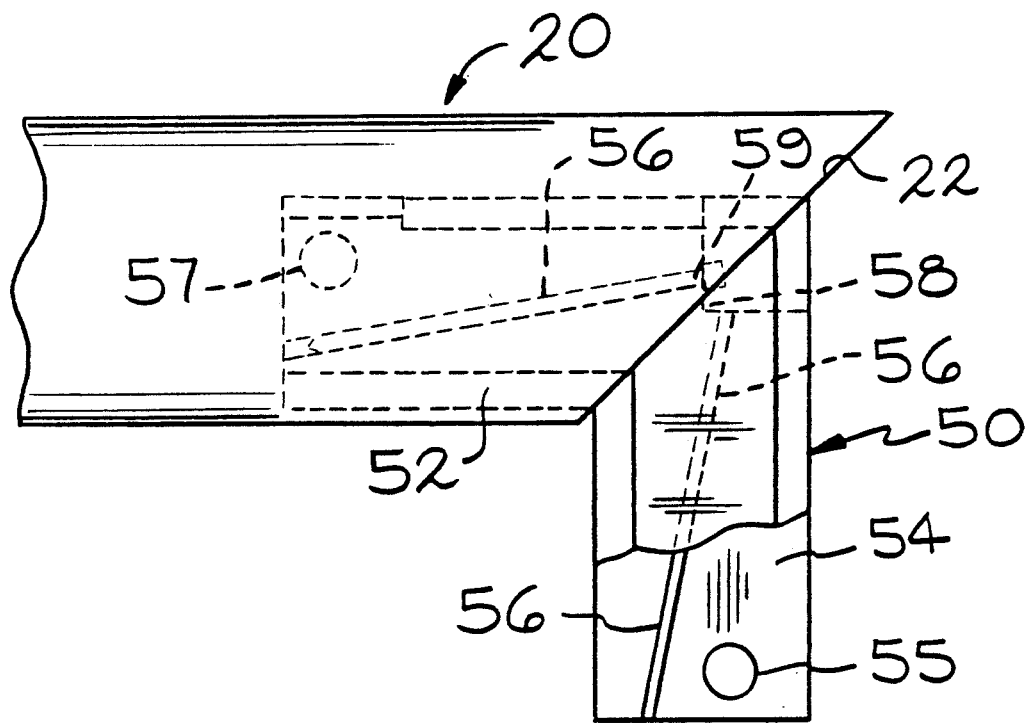
FIG. IV

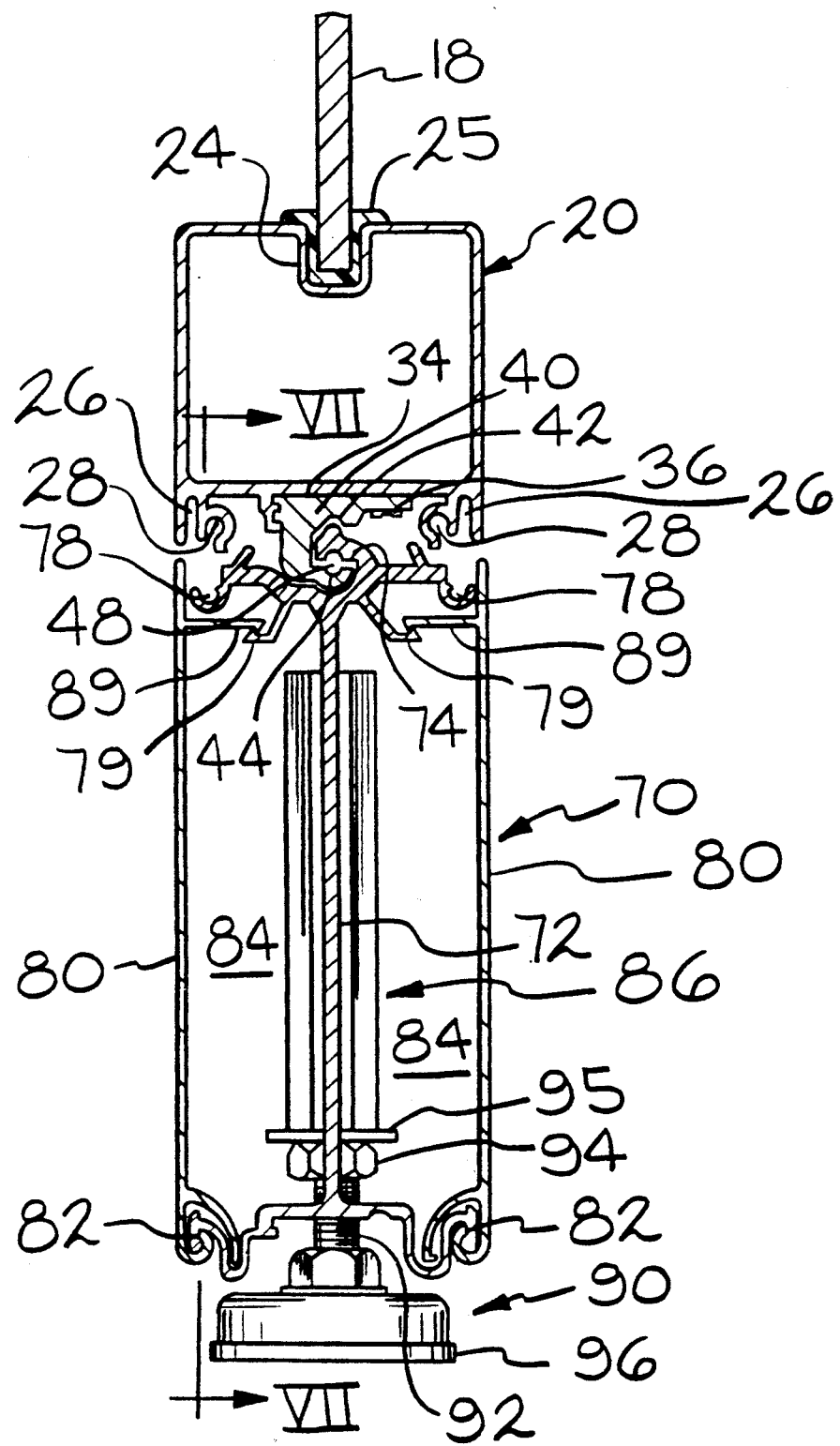
FIG. VI

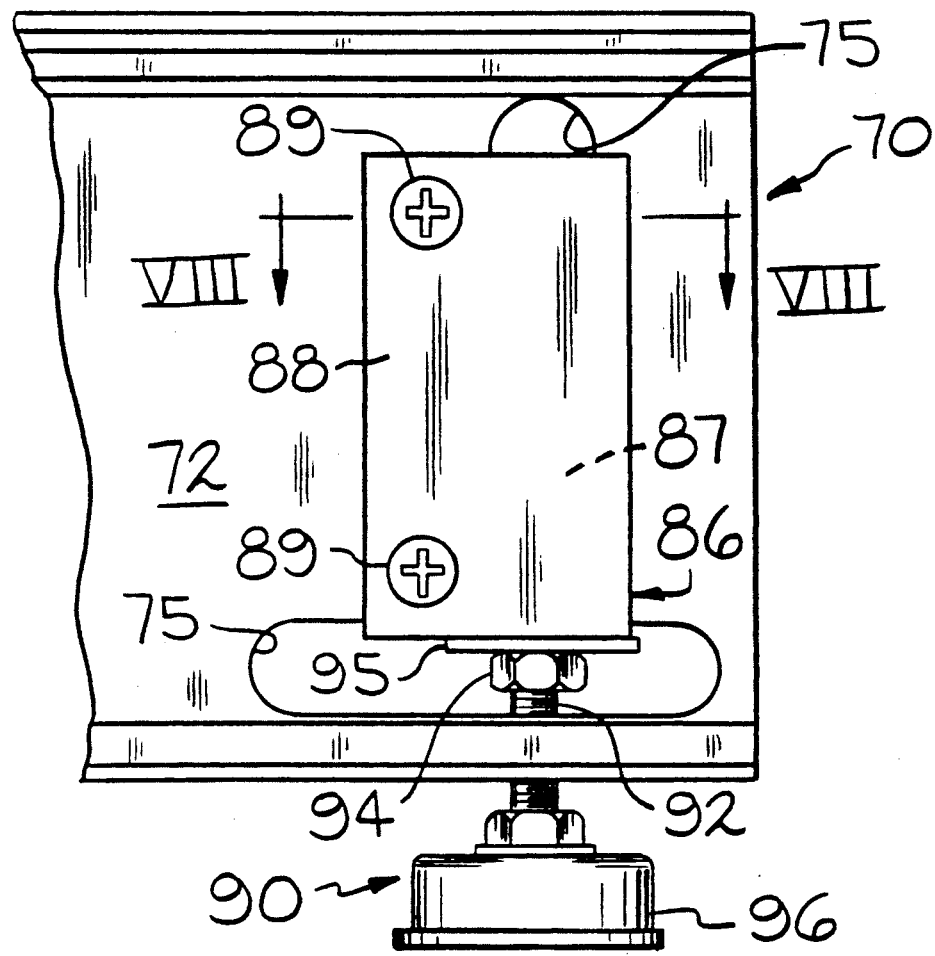
FIG. VII
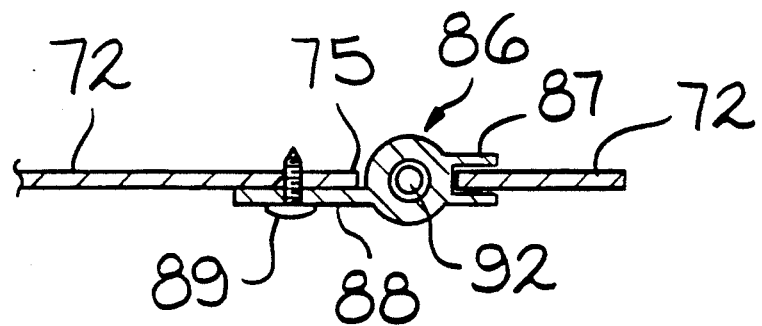
FIG. VIII

WALL PARTITION UNITS

This is a continuation of copending application Ser. No. 07/539,337 filed on Jun. 18, 1990 now U.S. Pat. No. 5,138,814.

BACKGROUND OF THE INVENTION

Partition walls made up of units comprising panels, raceways, baseboards and even the whole cubicles with shelves, desks, and the like, have long been known. Also units of this type have been anchored together by various types of fastening means along their edges, even including slide interfitting C-cross-sectional strips. Furthermore, angle blocks in mitered corners for fastening frame strips together are known. Also bolt-and-nut-type levellers have been long employed for the bottom edge or baseboard units of partition walls. Usually, the fasteners for the vertical portions of the panels making up the walls is different from that employed for horizontal raceways and/or baseboards so that panel units are often only usable in a given direction. Previously a common means for fastening such units and their mitered corners of frames involved welding and/or complicated and expensive tools for assembly.

SUMMARY OF THE INVENTION

Generally speaking, this invention deals with a common interhooking structure employed on the units of a partition wall, namely framed panels, raceways, posts, and some edge finishing strips. The outer edges of these units preferably comprise a central groove into which are attached, such as by screws, C-shaped uniform cross-sectional interlocking key members or strips at least adjacent the ends of the edges of the units. These C-cross-sectional key members on adjacent edges are longitudinally slid to interhook with each other and form a cylindrical aperture channel or hole between and by the "C"s. A self-tapping screw is then screwed into this cylindrical hole to wedge and lock the two C-sections together and the adjacent edges of their corresponding units. These screws may be removed and replaced easily so that the units can be easily assembled, disassembled and/or rearranged on location without the requirement of special tools.

The panel units are surrounded by frame strips of uniform cross-section, preferably of substantially rectangular tubular cross-sections. These panel units are made in multiples of a dimension, such as a given number of feet, yards, or meters in each direction, so that they can be assembled horizontally and/or vertically by the C-shaped interhooking key members located on the outer edges of their frame strips. In addition, the outer edges of the frame strips may include other parallel grooves for seating cover strips adjacent the outer planar surfaces of the panels, gasket strips of flexible material, and perforated strips of L-shaped cross-section into the perforations of which may be provided hooks for cantilevering shelves and other articles of furniture on the walls. These L-shaped strips may be attached into the same central grooves with or between the C-cross-section key interhooking fastening means. These frame strips may be made of extruded plastic or metal such as aluminum and also contain inner grooves for supporting wall panels, such as acoustic board, glass, wooden panels, or the like.

The corners of these frame strips for the panels are mitered and the miter joints are connected together by means of a pair of longitudinally complementary angle blocks having divergent legs that extend into the open ends of each of the frame strips at the mitered corners. The legs of these L-shaped blocks have complementary grooves extending along their legs into which grooves self-tapping screws are inserted for wedging the blocks apart to frictionally engage the inner surfaces of the frame strips for holding them together. These corner blocks may be made of cast plastic or metal such as aluminum with roughened surfaces for increasing the frictional grip within the frame strips at the mitered corners.

Posts may be provided between adjacent panel units, which posts have complementary grooves to most of those grooves above described on the outer edge frame strips for the panels. These posts may have plural complementary grooves at various angles to fasten the panels in the same and/or angular planes, including right angles, or both. Also the edges of the panel sections and/or posts at their outer ends and tops may be provided with strips having C-shaped cross-section interlocking key members for attaching finishing strips to the ends and/or tops of the panels, and for covering the multiple grooves in the outer edges of the frame strips.

Intermediate or at an edge of the panel units there may be provided raceway strips which comprise uniform I-shaped cross-sectional strips which have at at least one end of the "I" C-shaped cross-section key members to interfit with the edges of the panel units. The outer corners of the "I" are provided with hinge grooves at one end and snap-in grooves at the other for removably fastening cover strips for forming channels for conduits along their lengths. The web of the "I" may be cut out or perforated to form seats for electrical outlets and/or, in the event that this raceway strip is employed as a baseboard, for receiving sleeves for supporting and protecting nut-and-bolt-type levellers. These sleeves are provided with flanges for anchoring them to the web of the "I". The lower end of these bolts which project below the "I" may have a foot or pad for engaging the floor on which the panels are mounted and to be levelled.

OBJECTS AND ADVANTAGES

Accordingly, it is an object of this invention to produce a simple, efficient, effective, economical and easily assembled and disassembled partition wall unit having common interlocking fastening means at the edges of the units.

Another object is to provide a panel with a surrounding frame strip of uniform cross-section which can be assembled with other panels along any of its edges in any vertical or horizontal direction.

Still another object is to provide such a frame strip for panels with bevelled corners and means for assembling these mitered corners without welding or use of complicated tools.

A further object is to provide a raceway unit for a partition wall, which raceway provides conduit channels and, when used as a baseboard, supports levellers for the units forming the wall.

BRIEF DESCRIPTION OF THE VIEWS

The above mentioned and other features, objects and advantages and a manner of attaining them are described more specifically below by reference to an embodiment of this invention shown in the accompanying drawings, wherein:

FIG. I is a perspective view of three panel units with baseboard raceways assembled coplanar and angularly with these edge fastening means according to this invention being hidden;

FIG. II is an enlarged sectional view taken in the direction of the arrows along line II—II of FIG. I, showing the uniform cross-section of two adjacent panel frame strips connected together by the normally hidden C-shaped cross-sectional key members of this invention, together with the gasket strips and a perforated L-cross-sectional strip into which a shelf or furniture supporting hook is shown engaged and projecting outwardly between the gasket strips;

FIG. III is an enlarged section taken in the direction of the arrows along line III—III of FIG. I showing a pair of angle blocks for fastening a mitered corner of the surrounding panel frame strips, and a plastic cover for frame strips along the top edge of the panel unit;

FIG. IV is a left side elevation of the mitered corner and corner blocks shown in FIG. III with the vertical frame strip removed and part of the lower leg of the facing corner block being broken away;

FIG. V is a top elevation of the corner strip shown in FIG. IV, or a view taken in the direction of the arrows along line V—V of FIG. III;

FIG. VI is an enlarged vertical section taken in the direction of the arrows along line VI—VI of FIG. I showing the I-cross-section of the uniform strip of a baseboard raceway with its C-shaped key locking member being part of one end of the I-section which is connected to the bottom C-shaped key member attached to the bottom frame strip of a panel, and showing the removable side covers of the baseboard, together with an adjustable leveller for the panel;

FIG. VII is a vertical section taken in the direction of the arrows along line VII—VII of FIG. VI showing the nut-and-bolt leveller supported by a flanged sleeve; and FIG. VIII is a section taken in the direction of the arrows along line VIII—VIII of FIG. VII showing the cross-section configuration of the sleeve for supporting the levelling bolt.

DETAILED DESCRIPTION OF PREFERRED EMBODIMENTS

The Partition Wall Units

Figure 1:
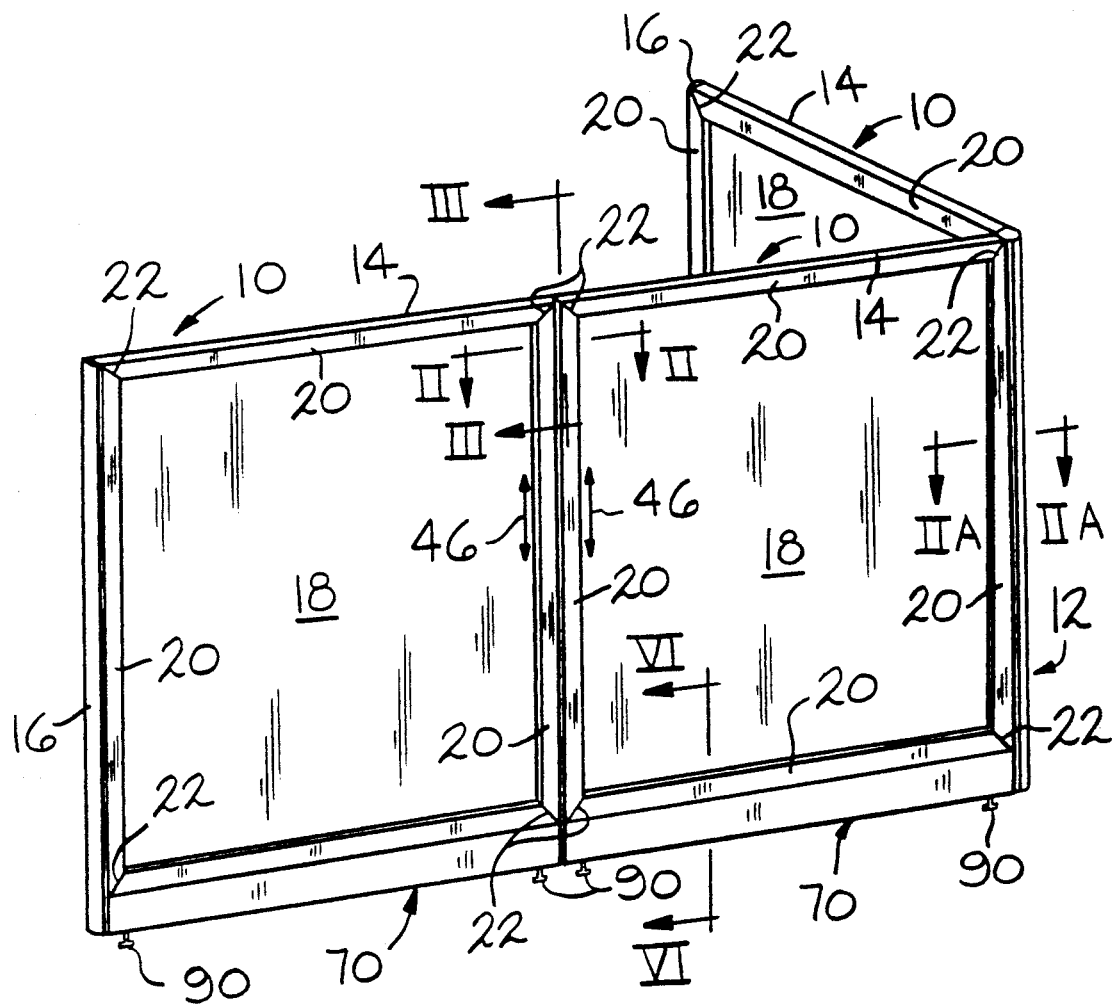

Referring first to FIG. I there is shown three identical panel units 10, the middle one of which is connected along its left vertical edge coplanar with one of the other two panel units, and along its right vertical edge to a post 12 which in turn is connected to the vertical edge of the third panel unit 10 at an angle to the plane of the first two units 10 mentioned. The top edge of each panel unit may be covered by a U-shaped snap-on plastic strip 14 with grooved flanges 15 at its ends (see also FIG. III), or it may have a special edge cover unit to match the composition of the panels 18 of the units 10. The panels 18 may be composed of sheet material, such as wood, glass, plastic, fabric, or an acoustic deadening material of any texture or color desired. Similarly, the vertical exposed outer edges of the panel units 10 may be covered with a similar covering strip 16 or cover unit to that described for the top cover 14. Surrounding each of the panel units 18 is a frame strip 20 of uniform cross-section which is mitered at its corners 22. Along the bottom edge of each of the panel units 10 there is shown a raceway baseboard unit 70 below which can be seen projecting near each end thereof a foot of and a nut-and-bolt leveller 90 (see FIGS. VI and VII).

The Panel Strips

In FIGS. II and VI the panel frame strips 20 are shown to comprise a substantially rectangular cross-sectional tube having an inner groove 24 which may be fitted with a U-shaped gasket 25 for surrounding the outer edge of a panel 18. It should be understood, however, that the panels 18 may be as thick as the tubular frame portions 20 and/or filled with acoustic deadening material without departing from the scope of this invention.

The outer edge of the frame strips 20 are shown to be provided with a plurality of longitudinal grooves of different shapes, namely: a pair of outer grooves 26 which are shown herein to be empty. However, they may be provided with a bridging strip (not shown) that extends into the grooves 26 of the two adjacent frame strips 20 shown in FIG. II. The next inner grooves 28 are shown in FIG. II to be fitted with flexible gasket strips 29, which gasket strips have a non-flexed uniform cross-section, but are shown spread apart on the upper side of FIG. II by the insertion of a hook 30 which may be provided behind the panel shown in FIG. I. Such hooks 30 engage the perforations 31 in a vertical L-shaped cross-section strip 32 that is removably attached by self-tapping screws 36 into central shallow groove 34 in the outer edge of the frame strip 20.

Edge Connectors

The simple, effective, and unique means for connecting the partition panel units 10, posts 12 and raceway strips 70 together along their adjacent edges is clearly shown in enlarged sections in FIGS. II and VI of the frame strips 20 surrounding the panel units 10. This connection between the units is affected by the slid interfitting of the C-shaped cross-section key elongated members 40 which have identical cross-sections and are provided with interfitting inner grooves 42 and outer ridges 44. When the ridges 44 fit in the grooves 42, after being slid together in the directions of the arrows 46 shown in FIG. I, they form a cylindrical hole or aperture 48, into which a self-tapping screw 49 is screwed to lock the two interhooked C-sections 40 together by wedging their ridges 44 in the grooves 42. This anchors together the two adjacent frame strips 20. It is important that these key members 40 have their outer ends near the ends of the frame strips 20 so that easy access can be had to the screws 49 from the open ends of the frame strips 20. These key members 40 usually are only a few inches or centimeters long and are attached to the central grooves 34 together with the L-shaped members 32 by the same screws 36. However, these C-shaped key members 40 may be spaced along or extend continuously along the panel frame strips in which latter instance the sliding action for interconnecting these C-shaped strips would require a sliding movement extending along the full length side of the panel unit 10. On the other hand, if these key members 40 are relatively short, a plurality of them are spaced along the panel frame strips, spaced distances greater than the length of each member 40. Then the adjacent panel unit strips need to be slid a distance slightly longer than the length of the key members 40, that is for connecting them and disconnecting them in the direction of the arrows 46 shown in FIG. I.

Corner Connectors

Referring now to the mitered corners 22 of the frame strips 20 around the frame panels 10. These corners are anchored together by a pair of identical complementary corner blocks 50 shown in FIGS. III through V. These blocks 50, in this instance, are shown to have right angle legs 52 and 54, which blocks, when fitted together one against the other parallelly, have their adjacent legs fit in and substantially fill the tubular center open ends of the frame strips 20 at their mitered corners 22. Between each of these L-shaped blocks, there are provided complementary grooves 56 (see FIG. IV) opening into the cut-out outer angle corner 58 of the block. The grooves 56 form cylindrical apertures or holes along each leg so that these apertures can be filled with self-threading screws 59 to wedge the two parallel blocks 50 apart so that their outer surfaces frictionally engage the inner surface of the ends of the tubular frame strips 20 to anchor them together at their corners. Preferably the outer surfaces of the corner blocks 50 are rough, such as made of cast plastic or metal, such as aluminum, to frictionally engage better the inner surface of the tubular frame strips 20 at the mitered junctions 22. In order to have access to these screws 59 the center groove 34 of each frame strip 20 may be cut out as shown at 35 in FIG. V. These blocks 50 may be provided with complementary interfitting projections 55 and cavities 57 at the ends of their legs to insure proper alignment of the pair of corner blocks 50.

Raceways

Referring now to the raceway strip 70 which may easily be adapted to a baseboard raceway as shown in FIGS. I, VI through VIII. This raceway strip 70 comprises a central I-shaped cross-section strip 72 which may be of extruded plastic or metal such as aluminum. The upper end of the "I" strip 72 has integrally formed there a C-shaped cross-section key member hook 74 that intermeshes with the C-shaped member 40 connected to the panel frame strip 20 above it (see FIG. VI). This end of the I-shaped raceway strip may also be provided with grooves at its outer edges to complement the grooves 26 and 28 on the frame strips 20, such as grooves 78 for the gasket strips 29 (not shown). This end of the I-strip 72 also has integral therein hook flanges 79 for engaging corresponding flanges 89 on the flexible plastic cover strips 80 which fit and hinge in hinge grooves 82 at the other end edges of the I-section 72. These snap-on hinged plastic flexible covers 80 form parallel channels 84 on each side of the web of the "I" strip 72 along which channels 84 conduits may be placed for connection to electrical outlets 71 (see FIG. I), etc. that may be set into apertures (not shown) in the web of the I-strip 72 for electrical outlet boxes.

Levellers

For the baseboard raceway 70, the web of the "I"-strip 72 may have an inverted T-shaped cut-out aperture 75 for mounting a nut-and-bolt-type leveller 90 journalled in a flanged sleeve 86. This sleeve 86 has a groove 87 on one outer side thereof and a radially extending flange 88 on the other side for anchoring the sleeve 86 in the vertical portion of the aperture 75 and fastening it to the web 72 by means of the screws 99 (see FIGS. VII and VIII). In the central longitudinal hole of this sleeve 86, there is guided the threaded bolt portion 92 of the leveller 90, which bolt cooperates with the nut 94 against washer 95 at the lower end of the sleeve 86. By rotating the nut 94 with a common wrench, the foot 96 on the lower end of the bolt 92 can be extended or retracted for adjusting the height and tilt of the baseboard raceway channel strip 70 and its corresponding panel unit 10 mounted thereon with respect to the floor on which the wall units rest.

It should be understood that the compositions of the different elements and parts employed in the units of this invention may vary without departing from the scope of this invention, that is they may be made of any desired material having sufficient strength, texture and/or color. The different units also may be readily assembled, disassembled and re-assembled in their location and at different desired angles and along different edges. Furthermore, the specific units of this invention are made in multiples of a single unit length, such as in whole numbers of feet, so that they may be mounted horizontally or vertically with respect to each other, and in the same and in different angular planes, controlled by the angles of the channels and grooves provided in the posts 12. Furthermore, although the panel units 10 are shown to be square, they may be rectangular or even parallelograms or triangles with corresponding different angled corner blocks. Also the raceway portion 70 may be provided intermediate or between panels or at desk height instead of, or as well as, along the baseboard or lower edge of the panel units.

While there is described above the principles of this invention in connection with specific apparatus, it is to be clearly understood that this invention is made only by way of example and not as a limitation to the scope of this invention.

We claim:

1. A wall partition unit (10) including a baseboard raceway (70) strip having a uniform I-shaped cross-section (72) having a web portion with an aperture (75) having an edge in the web portion, the improvement comprising:
   1) a sleeve (86) having outer opposite sides and being seated in said aperture said sleeve having a groove (87) along one outer side of said sleeve and a flange (88) along the opposite outer side of said sleeve, said groove seating the edge of said aperture in said web portion and said flange overlapping said web portion,
   2) means (99) for attaching said flange to said web portion,
   3) a threaded bolt means (92) in said sleeve and extending downwardly through and beyond said baseboard strip,
   4) a foot means (96) on said threaded bolt means that extends beyond said baseboard strip, and
   5) a nut (94) on said threaded bolt means in said aperture for axially adjusting the distance said foot means extends below said baseboard strip for levelling said partition.

2. A wall partition unit according to claim 1 wherein said web portion has
   1) opposite ends, each of which ends have opposite outer edges,
   2) a hinge groove (82) along at least one of said outer edges at one end of said web portion,
   3) a snap groove (79) along the outer edge at the other end of said web portion, and
   4) a cover panel (80) having opposite parallel edges with flanges (89) therealong, one edge flange fitting into said hinge groove and the other flange snapping into said snap groove.

3. A wall partition unit according to claim 2 wherein said one end of said web portion has said hinged grooves along both edges thereof and has said snap grooves along both edges of the other end of said web portion, and said raceway includes separate cover panels connected to the hinge and snap grooves on each side of said web portion.

4. A wall partition unit according to claim 2 including along at least one end of said web portion a C-shaped cross-section key member.

5. A wall partition unit according to claim 1 wherein said aperture provides a seat for an electrical outlet.

* * * * *